(12) United States Patent
Tagra et al.

(10) Patent No.: US 10,939,044 B1
(45) Date of Patent: Mar. 2, 2021

(54) AUTOMATICALLY SETTING ZOOM LEVEL FOR IMAGE CAPTURE

(71) Applicant: Adobe Inc., San Jose, CA (US)

(72) Inventors: Sanjeev Tagra, Panipat (IN); Sachin Soni, New Delhi (IN); Ajay Jain, Ghaziabad (IN); Ajay Bedi, Hamirpur (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/552,411

(22) Filed: Aug. 27, 2019

(51) Int. Cl.
| H04N 5/232 | (2006.01) |
| H04N 5/345 | (2011.01) |
| H04N 19/132 | (2014.01) |
| G06K 9/32 | (2006.01) |
| G06K 9/74 | (2006.01) |

(Continued)

(52) U.S. Cl.
CPC ....... *H04N 5/23296* (2013.01); *G06K 9/3233* (2013.01); *G06N 20/00* (2019.01)

(58) Field of Classification Search
CPC ............. H04N 5/23296; H04N 5/3454; H04N 3/1562; H04N 19/132; G06T 7/194; G06T 7/10; G06T 7/12; G06T 7/11; G06T 7/136; G06T 7/215; G06K 9/3232; G06K 15/1223; G06K 15/107; G06K 9/74; G06K 7/764; G06K 9/741; G06K 9/34; G06K 20/00
USPC .......... 348/240.99, 240.2, 240.1, 222.1, 239, 348/333.11, 26, 252, 211.9, 208.6, 597, 348/625, 661, 841; 382/164, 171, 173, 382/177, 199, 266, 269, 254, 263, 148, 382/299, 155, 157, 144, 212, 213, 283, 382/131
See application file for complete search history.

(56) References Cited

U.S. PATENT DOCUMENTS

| 6,917,384 B1 * | 7/2005 | Fukushima | ............ H04N 5/222 348/333.03 |
| 8,320,684 B2 * | 11/2012 | Son | .......................... G06K 9/36 382/232 |

(Continued)

OTHER PUBLICATIONS

McEntegart, "How to take the best photos with the ZenFone 3 Zoom", https://edgeup.asus.com/2017/zenfone-3-zoom-camera-guide/, Jul. 6, 2017, 40 pages.

(Continued)

*Primary Examiner* — Marly S Camargo
(74) *Attorney, Agent, or Firm* — FIG. 1 Patents

(57) ABSTRACT

A system obtains an image from a digital image stream captured by an imaging component. Both a foreground region of interest and a background region of interest present in the obtained image are identified, and the imaging component is zoomed out as appropriate to maintain a margin (a number of pixels) around both the foreground region of interest and the background region of interest. Additionally, a position of regions of interest (e.g., the background region of interest and the foreground region of interest) to improve the composition or aesthetics of the image is determined, and a composition score of the image indicating how good the determined position is from an aesthetics point of view is determined. A zoom adjustment value is determined based on the position of the regions of interest, and the imaging component is caused to zoom in or out in accordance with the zoom adjustment value.

20 Claims, 9 Drawing Sheets

(51) Int. Cl.
*G06T 7/194* (2017.01)
*G06T 7/11* (2017.01)
*G06T 7/12* (2017.01)
*G06N 20/00* (2019.01)

(56) References Cited

U.S. PATENT DOCUMENTS

| | | | |
|---|---|---|---|
| 10,313,417 B2* | 6/2019 | Chen | H04L 65/4069 709/219 |
| 10,757,335 B2* | 8/2020 | Jeon | H04N 5/23296 715/784 |
| 2003/0053673 A1* | 3/2003 | Dewaele | G06K 9/36 382/132 |
| 2009/0003699 A1* | 1/2009 | Dugan | G06K 9/6263 382/173 |
| 2013/0278604 A1* | 10/2013 | Georgis | G06T 5/23293 348/240.2 |

OTHER PUBLICATIONS

Shu,"How to take better pictures with your camera's automatic mode", https://www.digitaltrends.com/photography/how-to-take-better-pictures-in-your-cameras-automatic-mode/, Jul. 6, 2018, 15 pages.

Triggs,"What is the Huawei P20's Hybrid Zoom?", https://www.androidauthority.com/huawei-p20-hybrid-zoom-850575/, Apr. 13, 2018, 16 pages.

Wronski,"See Better and Further with Super Res Zoom on the Pixel 3", https://ai.googleblog.com/2018/10/see-better-and-further-with-super-res.html, Oct. 15, 2018, 13 pages.

* cited by examiner

AUTOMATICALLY SETTING ZOOM LEVEL FOR IMAGE CAPTURE

BACKGROUND

As computer technology has advanced image capture devices have become increasingly commonplace in our lives. For example, dedicated cameras come in a variety of different types allowing users to capture digital images, many wireless devices, such as smartphones and tablets, include a camera allowing users to capture digital images, and so forth. These cameras oftentimes have one or more automatic modes allowing the camera to automatically set various image capture parameters, such as light sensitivity (ISO), aperture and shutter speed, focus, and so forth.

While these automatic modes help users capture better images, they are not without their problems. One such problem is that these automatic modes do not set all image capture parameters. Leaving responsibility for setting some image capture parameters in the hands of users, particularly novice users, can lead to poor images being captured and user dissatisfaction with their cameras.

SUMMARY

To mitigate the drawbacks of conventional cameras, a zoom level determination system as implemented by a computing device is described to automatically set a zoom level for image capture. An image of a digital image stream is obtained from an imaging component. One or more regions of interest in the image are identified, including at least a background region of interest in the image or a foreground region of interest in the image. A determination is made that a margin around the one or more regions of interest is acceptable, and a new positioning of the one or more regions of interest is determined. A zoom adjustment value to increase or decrease a zoom level is determined based on the one or more regions of interest having the new positioning, and the imaging component is caused to zoom in or out based on the zoom adjustment value.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
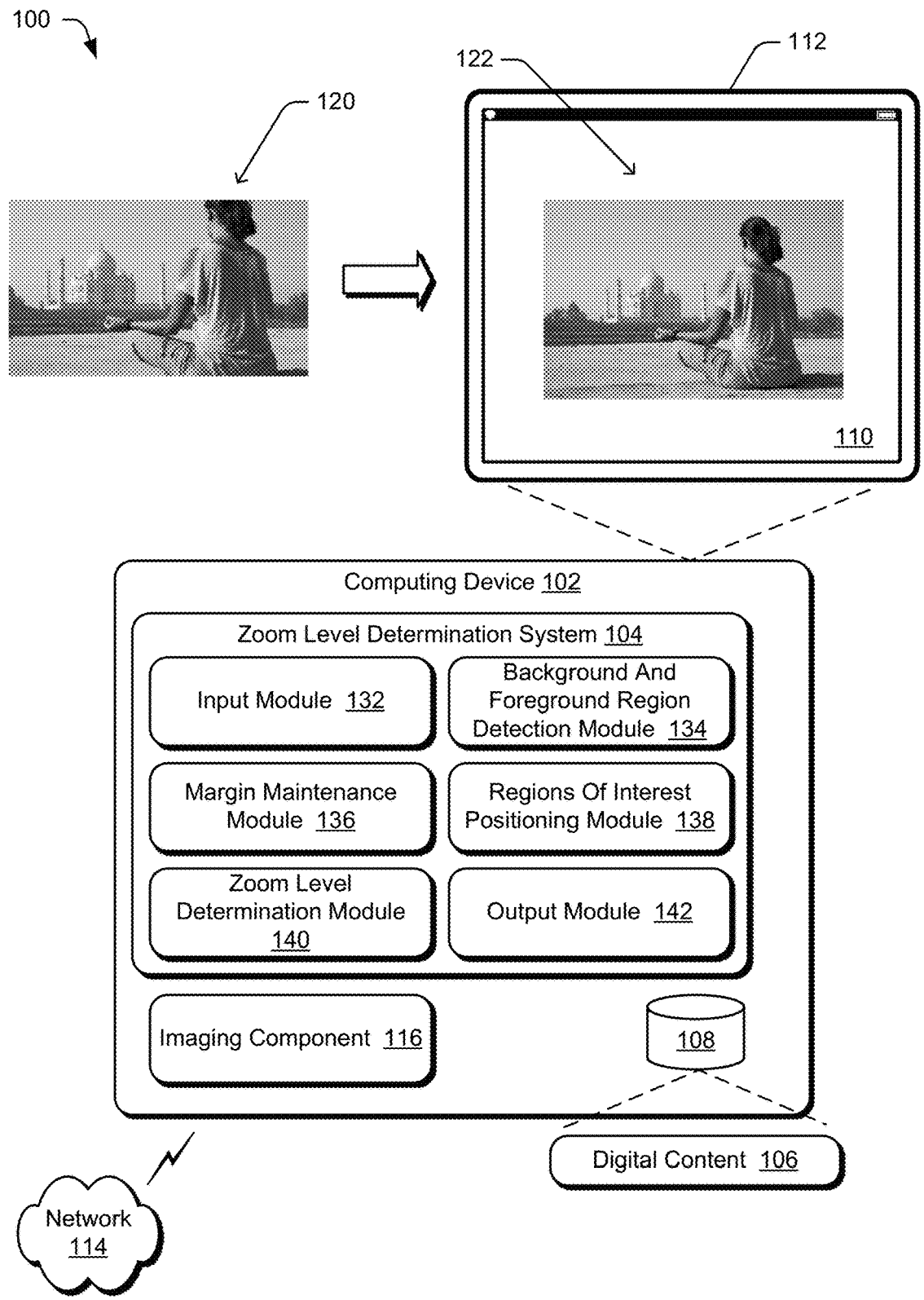
FIG. 1 is an illustration of a digital medium environment in an example implementation that is operable to employ the automatically setting zoom level for image capture described herein.

Current solutions for capturing digital images lack any capability to assist the user in setting the appropriate zoom level for a picture. Current cameras oftentimes have a zoom control, such as physical buttons or switches, touchscreen gestures, and so forth allowing the user to zoom in and zoom out on a scene being captured. However, the user must still decide on the proper zoom level (e.g., how far to zoom in or out) and activate this zoom control himself. This can be challenging for users, particularly novice users that are not able to select a good zoom level resulting in a picture with poor composition.

To overcome these problems a zoom level determination system automatically selects a zoom level for image capture and causes an imaging component to zoom to the selected zoom level. Generally, the zoom level determination system obtains an image from a digital image stream captured by an imaging component. One or both of a foreground region of interest and a background region of interest present in the obtained image are identified, and the imaging component is zoomed out as appropriate to maintain a margin (e.g., a number of pixels) around the foreground region of interest and the background region of interest. Additionally, a new position of the regions of interest (e.g., the background region of interest and the foreground region of interest) is determined and a composition score of the image when the regions of interest are in that new position is also determined. The new position of the regions of interest is determined to improve the composition or aesthetics of the image, and the composition score is a value that indicates how good aesthetically the determined position is. A zoom adjustment value is determined based on the new position of the regions of interest, and the imaging component is caused to zoom in or out in accordance with the zoom adjustment value.

More specifically, the foreground and background regions of interest in the image are identified using a multi-column machine learning system. The multi-column machine learning system includes a machine learning system that is trained to generate a foreground mask identifying one or more salient objects in the foreground of the image as the foreground region of interest. The multi-column machine learning system also includes an additional machine learning system that is trained to generate a background mask identifying one or more salient objects in the background of the image as the background region of interest. The generated background mask does not include objects in the foreground region of interest. Similarly, the generated foreground mask does not include objects in the background region of interest.

Given the foreground mask and the background mask, one or more zoom adjustment values to maintain an acceptable margin around both the background region of interest and the foreground region of interest are identified. The zoom adjustment value is identified, for example, by determining a smallest rectangular region (e.g., a bounding box) in the image that includes the foreground mask and the background mask. For each edge of the rectangular region, the margin refers to the distance (e.g., a number of pixels) between the edge of the rectangular region and the closest parallel edge of the image.

If the margin around the background and foreground regions of interest is not acceptable, then a zoom adjustment value is provided to the imaging component. The zoom adjustment value indicates to the imaging component to decrease the zoom setting (also referred to as zooming out) to increase the field of view of the imaging component. By zooming out, the field of view of the imaging component is increased in an attempt to maintain an acceptable margin around the background and foreground regions of interest and avoid the situation where one of the regions of interest is cut through by an edge of the image. This allows a visually noticeable or visually appealing separation between the background and foreground regions of interest and the edges of the image.

In response to determining that the margin around the background and foreground regions of interest is acceptable (e.g., a threshold margin is maintained or a threshold amount for zooming out has been met to prevent the system from zooming out too much), a new position of regions of interest (e.g., the background region of interest and the foreground region of interest) is determined to improve the composition or aesthetics of the image. A composition score of the image is also determined that indicates how good the new position is from an aesthetics point of view as determined by a trained machine learning system. In one or more implementations, a machine learning system is trained to determine a new position of the regions of interest as well as a composition score for the new position while not altering the positions of the background and foreground regions of interest by more than a threshold amount (e.g., ¼ of the size of the foreground region of interest and the background region of interest) to prevent the system from substantially changing the field of view.

A zoom adjustment value based on the new position of the regions of interest is identified and provided to the imaging component. The zoom adjustment value can be determined in various manners. For example, the zoom adjustment value can indicate to zoom in so that at least one of the edges of a smallest rectangular region that includes the region of interest is the same as an edge of the image. By way of another example, the zoom adjustment value can indicate to zoom in by a particular amount (such as 1% or 2% of the current zoom level). By way of another example, the zoom adjustment value can indicate to zoom in or out so that a margin (e.g., 6 pixels or 20 pixels) between each edge of a smallest rectangular region that includes the region of interest and the closest parallel edge of the image is maintained.

This zooming in or out, including obtaining new images, generating foreground and background masks for each obtained image, maintaining an acceptable margin around both the foreground mask and the background mask, determining a new positioning of regions of interest, and generating a composition score can be repeated one or more times until a position of the regions of interest that satisfies a composition score condition is achieved. The composition score condition can be implemented in a variety of different manners. For example, the composition score condition can be that the composition scores for different regions of interest positions in different (e.g., sequential) obtained images becomes saturated (e.g., varies by less than a threshold amount, such as 2% over a sequence of 5 images). By way of another example, the composition score condition can be that the composition scores for different regions of interest positions in different (e.g., sequential) obtained images begins to decrease (e.g., the composition scores decrease over a sequence of 3 images). By way of another example, the composition score condition can be that the composition score for a regions of interest position exceeds a threshold amount.

In response to determining that the composition score condition is satisfied, the zooming in or zooming out ceases and the imaging component can capture the digital image with the set zoom level. This zoom level is the zoom level obtained by the various zoom adjustment values applied to the imaging component by the zoom level determination system. This captured image can then be stored, printed, transferred to another device, and so forth.

The techniques discussed herein automatically set a zoom level for image capture by selecting a zoom level for image capture and causing the imaging component to zoom to that zoom level. Automatically selecting the zoom level improves the quality of captured images (e.g., the composition or aesthetics of the image), especially for novice users that lack the knowledge or desire to spend the time to determine a good composition for the image. Additionally, by automatically selecting a zoom level the techniques discussed herein alleviate the need for the user to select a zoom level. This is particularly useful when using small form factor devices on which controlling the zoom level is difficult, on devices that the user is not familiar with, in certain conditions (e.g., when a user is wearing gloves), and so forth. Automatically selecting a zoom level also reduces the amount of time the user expends in capturing an image because he or she need not manually determine a good composition of the image, thereby saving the user time and reducing device resource usage (e.g., power).

Furthermore, the techniques discussed herein allow capture of an image having a good composition while having a higher resolution. For example, conventional solutions allow a user to manually zoom out on a scene, capture a digital image, then later crop and enlarge the image so the composition of the image is what he or she desires. However, by cropping the digital image some resolution of the image is lost due to the part of the image that is cropped out—the portion of the image that remains and that can be enlarged includes fewer pixels than would be present when using the techniques discussed herein because when using the techniques discussed herein the imaging component was zoomed in prior to image capture.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the automatically setting zoom level for image capture described herein. The illustrated environment 100 includes a computing device 102, which may be configured in a variety of ways. The computing device 102, for instance, may be configured as a mobile device (e.g., assuming a handheld configuration such as a tablet or mobile phone), a wearable device (e.g., augmented reality or virtual reality headsets), a camera, a laptop computer, a desktop computer, and so forth. Thus, the computing device 102 may range from full resource devices with substantial memory and processor resources (e.g., personal computers, game consoles) to a low-resource device with limited memory and/or processing resources (e.g., mobile devices, dedicated cameras). Additionally, although a single computing device 102 is shown, the computing device 102 may be representative of a plurality of different devices, such as multiple servers utilized by a business to perform operations "over the cloud" as described in FIG. 9.

The computing device 102 is illustrated as including a zoom level determination system 104. The zoom level determination system 104 is implemented at least partially in hardware of the computing device 102 to process and transform digital content 106, which is illustrated as maintained in storage 108 of the computing device 102. Such processing includes creation of the digital content 106 and rendering of the digital content 106 in a user interface 110 for output, e.g., by a display device 112. The digital content 106 refers to digital images, such as digital still images (e.g., digital pictures) or digital video. The storage 108 can be any of a variety of different types of storage, such as random access memory (RAM), Flash memory, solid state drive, magnetic disk drive, and so forth. Although illustrated as implemented locally at the computing device 102, functionality of the zoom level determination system 104 may also be implemented in whole or part via functionality available via a network 114, such as part of a web service or "in the cloud."

The zoom level determination system 104 automatically selects a zoom level for capturing a digital image and causes an imaging component 116 to automatically zoom to the selected zoom level. For example, the zoom level determination system 104 receives as an input a digital image 120, automatically selects a zoom level (zooming out in this example), and causes the imaging component 116 component to zoom to a particular zoom level at which the imaging component 116 can capture the digital image at the selected zoom level, illustrated as digital image 122. The imaging component 116 can be any of a variety of image capture devices implementing any of a variety of different technologies, such as a charge-coupled device (CCD) sensor, a complementary metal-oxide-semiconductor (CMOS) sensor, and so forth.

Although illustrated as being included in the computing device 102, additionally or alternatively the imaging component 116 can be implemented separately from the computing device 102. In such situations, computing device 102 and the imaging component 116 can communicate with one another via various connections, such as a wired connection, a wireless connection, a network, etc.

An example of functionality incorporated by the zoom level determination system 104 to process the digital content 106 is illustrated as an input module 132, a background and foreground detection module 134, a margin maintenance module 136, a regions of interest positioning module 138, a zoom level determination module 140, and an output module 142.

The input module 132 implements functionality to obtain an image of a digital image stream captured by the imaging component 116. The background and foreground detection module 134 implements functionality to identify a background region of interest and a foreground region of interest in the obtained digital image. The margin maintenance module 136 implements functionality to identify one or more zoom adjustment values to maintain an acceptable margin around both the background region of interest and the foreground region of interest. The zoom adjustment value indicates to zoom in (increase the magnification and reduce the field of view of the imaging component 116) or zoom out (decrease the magnification and expand the field of view of the imaging component 116).

The regions of interest positioning module 138 implements functionality to determine a new position of regions of interest (e.g., the background region of interest and the foreground region of interest) and a composition score of the image when the regions of interest are in that new position. The zoom level determination module 140 implements functionality to determine a zoom adjustment value for which the background region of interest and the foreground region of interest have the new positioning. The zoom adjustment value indicates to zoom in or zoom out. The output module 144 implements functionality to cause the imaging component to zoom in or zoom out in accordance with the zoom adjustment value.

In general, functionality, features, and concepts described in relation to the examples above and below may be employed in the context of the example systems and procedures described herein. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Zoom Level Determination System Architecture

Figure 2:
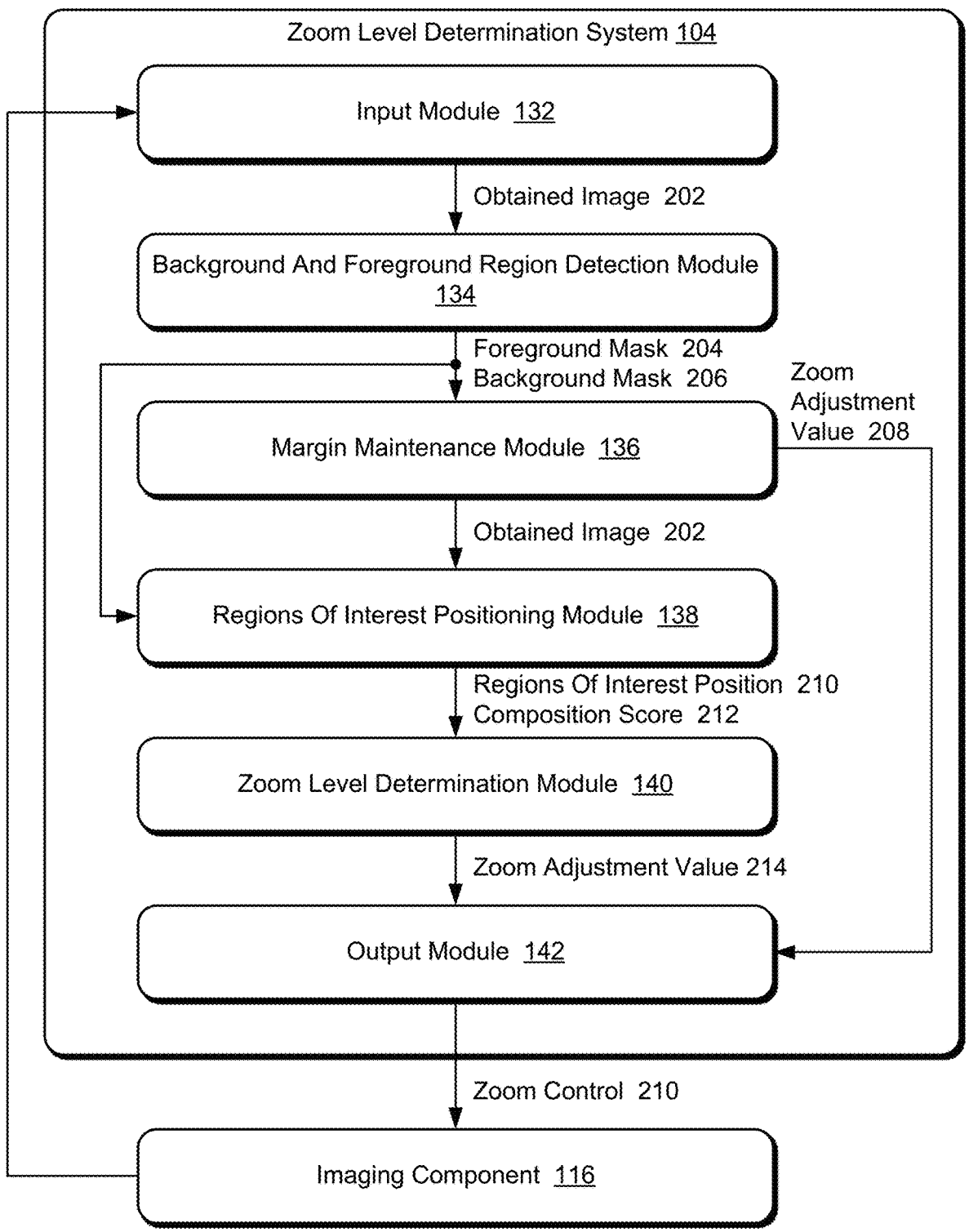
FIG. 2 is an illustration of an example architecture of a zoom level determination system.

FIG. 2 is an illustration of an example architecture of a zoom level determination system 104. The zoom level determination system 104 includes the input module 132, the background and foreground detection module 134, the margin maintenance module 136, the regions of interest positioning module 138, the zoom level determination module 140, and the output module 142.

The input module 132 implements functionality to obtain an image of a digital image stream captured by the imaging component 116. The imaging component 116 captures a digital image stream at a particular rate (e.g., 30 images or frames per second). The obtained image is one of these images or frames from the digital image stream, providing a temporary view of the scene as it appears (e.g., on a display screen of the computing device 102) before the user inputs a command to take a picture. For example, the imaging component 116 captures a digital image stream and the computing device 102 displays that digital image stream on the display device 112. The individual images or frames in that digital image stream need not be (but can be) stored or saved by the computing device 102. As the zoom level determination system 104 causes the imaging component 116 to zoom in or out, as discussed in more detail below, the displayed digital image stream is zoomed in or out. In response to a user input command for the computing device 102 to take a picture (e.g., a command to capture an image), the input module 116 obtains an image of the digital image stream.

The input module 132 can obtain an image of the digital image stream in a variety of different manners, such as by issuing a request for an image from the imaging component 116, by having an image pushed from the imaging component 116, by receiving the digital image stream and selecting an image, and so forth. The input module 132 provides the obtained image 202 to the background and foreground detection module 134. Each image of the digital image stream refers to a single frame in the digital image stream. It should be noted that each image in the digital image stream need not be stored or saved by the computing device 102. Rather, individual images of the digital images can be stored or retained by the computing device 102 in response to a user input (e.g., selecting a shutter release or capture button), allowing the stored or retained captured digital image to be printed, transmitted to another device, and so forth.

The background and foreground detection module 134 implements functionality to identify a foreground region of interest and a background region of interest in the obtained digital image 202. The foreground region of interest includes one or more salient objects in the foreground of the digital image 202. Each of these one or more salient objects in the foreground is an object that adds aesthetic value to the digital image 202. For example, the foreground region of interest may include a group of people or a pet.

The background region of interest includes one or more salient objects in the background of the digital image 202. Each of these one or more salient objects in the background is an object that adds aesthetic value to the digital image 202. For example, the background region of interest may include a monument or a waterfall. It should be noted that the detection module 134 detects as the background region of interest one or more salient objects in the background of the digital image 202 rather than simply using as the background region of interest the portion of the digital image 202 that is not in the foreground region of interest.

The background and foreground detection module 134 generates a foreground mask 204 that identifies the foreground region of interest, and a background mask 206 that identifies the background region of interest. The foreground region of interest can be the foreground mask 204, or a bounding box around the foreground mask 204 (e.g., a smallest rectangular box that includes all of the foreground mask 204). Similarly, the background region of interest can be the background mask 206, or a bounding box around the background mask 206 (e.g., a smallest rectangular box that includes all of the background mask 206). It should be noted that the foreground mask 204 need not exactly identify all pixels in the foreground region of interest and that the background mask 206 need not exactly identify all pixels in the background region of interest. For example, due to color similarities between pixels at the edge of a region of interest and pixels that are not part of the region of interest but are adjacent to those pixels at the edge of the region of interest, there may be pixels along the edge of a region of interest that are not included in the corresponding mask or pixels that are not part of the region of interest that are included in the corresponding mask.

Figure 3:
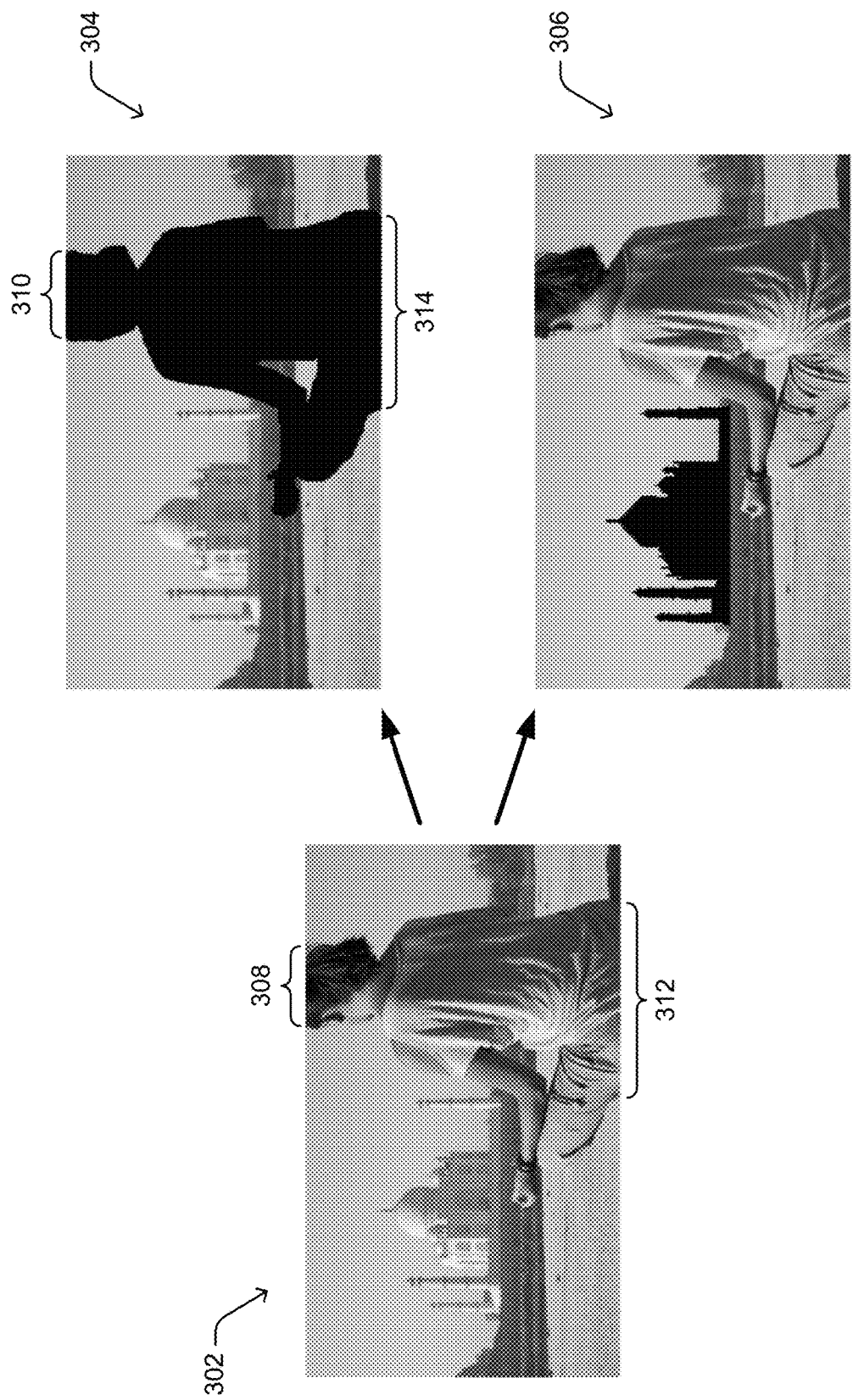
FIG. 3 illustrates an example foreground mask and background generated for an example digital image.

FIG. 3 illustrates an example foreground mask and background generated for an example digital image 302. The foreground mask 304 is illustrated as having black pixels that make up each object in the foreground region of interest. The background mask 306 is illustrated as having black pixels that make up each object in the background region of interest.

Returning to FIG. 2, in one or more implementations, the background and foreground detection module 134 includes two machine learning systems, each of which can be implemented using various different machine learning techniques. One machine learning system identifies the background region of interest and the other machine learning system identifies the foreground region of interest. Accordingly, the background and foreground detection module 134 is also referred to as using a multi-column machine learning system.

Machine learning systems refer to a computer representation that can be tuned (e.g., trained) based on inputs to approximate unknown functions. In particular, machine learning systems can include a system that utilizes algorithms to learn from, and make predictions on, known data by analyzing the known data to learn to generate outputs that reflect patterns and attributes of the known data. For instance, a machine learning system can include decision trees, support vector machines, linear regression, logistic regression, Bayesian networks, random forest learning, dimensionality reduction algorithms, boosting algorithms, artificial neural networks, deep learning, and so forth.

For example, the background and foreground detection module 134 can employ one or more convolutional neural networks (CNNs). A CNN is formed from layers of nodes (i.e., neurons) and can include various layers such as an input layer, an output layer, and one or more hidden layers such as convolutional layers, pooling layers, activation layers, fully connected layers, normalization layers, and so forth.

Figure 4:
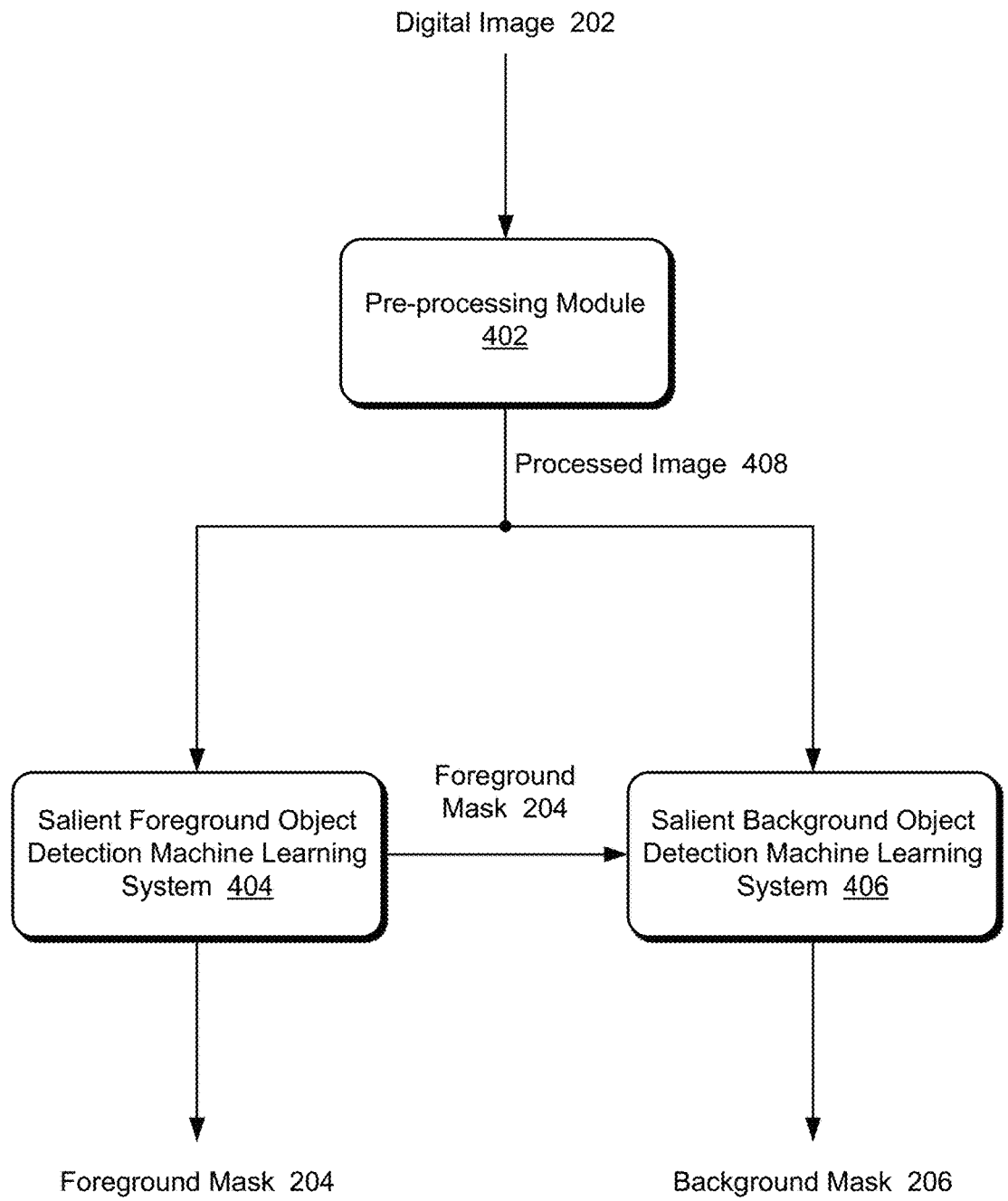
FIG. 4 illustrates an example implementation of a background and foreground detection module.

FIG. 4 illustrates an example implementation of the background and foreground detection module 134. The background and foreground detection module 134 includes a pre-processing module 402, a salient foreground object detection machine learning system 404, and a salient background object detection machine learning system 406.

The obtained digital image 202 is provided to the pre-processing module 402, which generates a processed image 408. The pre-processing module 402 performs various re-sizing and normalization operations to prepare the digital image 202 for input to the machine learning systems 404 and 406. In one or more implementations, the pre-processing module 402 re-sizes the digital image 202 so that the digital image 202 (a rectangle) has a longest side of 256 pixels. This re-sizing of the digital image 202 typically reduces the size of the digital image 202. Reducing the size of the digital image 202 improves the performance of the background and foreground detection module 134 because smaller sized digital images can be analyzed by the machine learning systems 404, 406 more quickly than larger sized digital images. This quicker analysis results in the machine learning systems 404, 406 using fewer resources (e.g., processor resources, energy resources to power the processor or other hardware implementing the machine learning systems 404, 406) than when analyzing larger sized digital images. Furthermore, reducing the size of the digital images allows the background and foreground detection module 134 to generate acceptable masks because the masks are used to generate a composition score, as discussed in more detail below, rather than for more demanding operations like selection.

The pre-processing module 402 provides the processed image 408 to the salient foreground object detection machine learning system 404, which generates the foreground mask 204. In an implementation example, the salient foreground object detection machine learning system 404 is a ResNet deep neural network trained to detect salient foreground objects. The machine learning system 404 uses the ResNet deep neural network as the main feature extractor and uses as the last convolution block an Atrous Spatial Pyramid Pooling layer for finding saliency in the objects.

The pre-processing module 402 also provides the processed image 408 to the salient background object detection machine learning system 406, which generates the background mask 206. The salient foreground object detection machine learning system 406 also provides the foreground mask 206 to the salient background object detection machine learning system 406. The salient background object detection machine learning system 406 is similar to the salient foreground object detection machine learning system 404, except that the salient background object detection machine learning system 406 is trained to detect salient background objects that do not overlap the salient foreground objects indicated in the foreground mask 204. In an implementation example, the machine learning system 406 uses a ResNet deep neural network as the main extractor and uses as the last convolution block an Atrous Spatial Pyramid Pooling layer for finding saliency in the objects.

The salient foreground object detection machine learning system 404 is trained to generate foreground masks that identify salient foreground objects in digital images. The salient foreground object detection machine learning system 404 is trained, for example, on a set of training images that include masks for the salient objects in the foreground.

The salient background object detection machine learning system 406 is trained to generate background masks that identify salient background objects in digital images. The salient background object detection machine learning system 406 is trained separately from the salient foreground object detection machine learning system 404. The salient background object detection machine learning system 406 is trained, for example, on a set of training images that include masks for the salient objects in the background as well as, for each such training image, a foreground mask for the training image.

The background and foreground detection module 134 is discussed above as using the foreground mask 204 in identifying the background mask 206. This gives the foreground mask 204 more weight than the background mask 206 because the background mask 206 is generated so as to not include any of the foreground mask 204. However, in situations in which giving the background mask more weight is desired, the background mask 206 can be used in identifying the foreground mask 204. In such situations, rather than the foreground mask 204 being an input to the salient background object detection machine learning system 406, the background mask 206 is an input to the salient foreground object detection machine learning system 404, which generates the foreground mask 204 source so as to not include any of the background mask 206.

In one or more implementations, whether to give the background mask more weight than the foreground mask or give the foreground mask more weight than the background mask is a design choice made by the designer or developer of the zoom level determination system 104. Additionally or alternatively, whether to give the background mask more weight than the foreground mask or give the foreground mask more weight than the background mask can be made by the user (e.g., via configuration settings). For example, the computing device 102 may include two different zoom level determination systems 104, one giving the background mask more weight than the foreground mask and the other giving the foreground mask more weight than the background mask, and the user can select which zoom level determination system to use. By way of another example, the zoom level determination system 104 include two different background and foreground detection modules, one giving the background mask more weight than the foreground mask and the other giving the foreground mask more weight than the background mask, and the user can select which background and foreground detection module to use.

Whether to give the background mask more weight than the foreground mask or give the foreground mask more weight than the background mask can be determined based on various different factors. For example, which of the foreground and the background of images is deemed most important (e.g., by the designer or developer of the zoom level determination system 104, or by the user) can be used to determine which of the foreground mask and the background mask is given more weight. So, for example, if the computing device 102 is capturing images in one mode (e.g., a portrait mode), the foreground may be deemed most important and the foreground mask is given more weight than the background mask. However, if the computing device 102 is capturing images in another mode (e.g., a landscape mode), the background may be deemed most important and the background mask is given more weight than the foreground mask.

Returning to FIG. 2, it should be noted that in some situations the background and foreground detection module 134 does not detect one or both of a foreground mask and a background mask. In such situations, the background and foreground detection module 134 proceeds in accordance with the following discussion except using only the one of the two masks that was detected. In situations in which neither a foreground mask nor a background mask is detected, the background and foreground detection module 134 proceeds in accordance with the following discussion except treating the entire image as the background mask.

The background and foreground detection module 134 provides the foreground mask 204 and the background mask 206 to the margin maintenance module 136. The margin maintenance module 136 implements functionality to identify one or more zoom adjustment values to maintain an acceptable margin around both the background region of interest and the foreground region of interest. This margin is a distance between these regions of interest and the edge of the obtained image 202.

In one or more implementations, the margin is identified by determining the smallest rectangular region in the obtained image 202 that includes the foreground region of interest (e.g., as indicated by the foreground mask 204) and the background region of interest (e.g., as indicated by the background mask 206). The margin is then the distance, for each edge of the rectangular region, between the edge of the rectangular region and the closest parallel edge of the image 202. In one or more implementations, an acceptable margin is a fixed value (e.g., at least 6 pixels). Additionally or alternatively, an acceptable margin can be a variable value (e.g., at least 1% of the distance between an edge of the rectangular region and the closest parallel edge of the image 202). The value of the acceptable margin can be selected (e.g., preset) by the developer or designer of the zoom level determination system 104, selected (e.g., via configuration settings) by the user of the zoom level determination system 104, etc. in order to maintain a visually noticeable or visually appealing separation between the edges of the rectangular region and the edges of the image 202.

If the margin around the background and foreground regions of interest is not acceptable, then the margin maintenance module 136 provides a zoom adjustment value 208 to the output module 142. The zoom adjustment value 208 indicates to the output module 142 to cause the imaging component 116 to decrease the zoom setting (also referred to as zooming out) to increase or expand the field of view of the imaging component 116. If the margin around the background and foreground regions of interest is not acceptable, then edge of the image 202 may cut through one of the regions of interest (e.g., the entire region of interest is not included in the image 202). By zooming out, the field of view of the imaging component 116 is increased in an attempt to maintain an acceptable margin around the background and foreground regions of interest and avoid the situation where one of the regions of interest is cut through by an edge of the image 202.

An example of a region of interest being cut through is illustrated in FIG. 3. As shown in both the digital image 302 and the foreground mask 304, an acceptable margin around the foreground region of interest is not maintained and the foreground region of interest is cut through by the edge of the digital image 302. The foreground region of interest being cut through is illustrated, for example, at 308 and 310 where the top of the woman's head is cut off by the top edge of the digital image, and at 312 and 314 where the lower part of the woman's legs are cut off by the bottom edge of the digital image. Accordingly, there is not an acceptable margin around the foreground region of interest.

Returning to FIG. 2, the zoom adjustment value 208 indicates a particular amount by which the imaging component 116 is to zoom out, such as 1% or 2% of the current zoom level. In one or more implementations, the margin maintenance module 136 is pre-configured (e.g., by the developer or designer of the zoom level determination system 104) with this particular amount (e.g., 1% or 2%). Additionally or alternatively, this particular amount is a user-configurable value. The zoom adjustment value 208 can be a small amount (e.g., 1% or 2% of the current zoom level) to avoid having the imaging component 116 zoom out too far or too quickly.

The zoom adjustment value 208 is provided to the output module 142, which provides a zoom control 210 to the imaging component 116. The zoom control 210 is a command or instruction that causes the imaging component 116 to zoom in or out by a particular amount. In response to receipt of the zoom adjustment value 208, the output module 142 provides a command or instruction to the imaging component 116 that causes the imaging component 116 to zoom out by the zoom adjustment value 208.

Zooming out the imaging component 116 increases or expands the field of view of the imaging component 116, which can result in new background or foreground regions of interest. Accordingly, the input module 132 obtains a new image 202 and the background and foreground detection module 134 determines a new foreground mask 204 and a new background mask 206 for the new image 202. This zooming out can be repeated multiple times until no region of interest is cut through by an edge of the image.

In one or more implementations, the margin maintenance module 136 limits the amount by which the imaging component 116 is zoomed out to keep the imaging component 116 from zooming out too far. For example, the margin maintenance module 136 limits the amount by which the imaging component 116 is zoomed out to a threshold amount, such as 10% of the zoom level when the zoom level determination system 104 began the process of determining the zoom level. The margin maintenance module 136 can have a default threshold amount (e.g., 10%) that is optionally a user-configurable value. Various different threshold amounts can be selected in order to prevent the margin maintenance module 136 from zooming out too much (e.g., and drastically altering the field of view). If the threshold amount for zooming out has been met, then the margin around the background and foreground regions of interest is deemed to be an acceptable margin.

In response to determining that a margin around the background and foreground regions of interest is acceptable, the margin maintenance module 136 provides the obtained image 202 to the regions of interest positioning module 138. The obtained image 202 is the most recently obtained image 202 (after any zooming out resulting from operation of the margin maintenance module 136).

The regions of interest positioning module 138 implements functionality to determine a position 210 of regions of interest (e.g., the background region of interest and the foreground region of interest) and a composition score 212 of the image when the regions of interest are in that position. The regions of interest positioning module 138 determines the position 210 of the regions of interest based on the obtained image 202 as well as any foreground mask 204 and background mask 206 (e.g., as provided by the background and foreground detection module 134) to improve the composition or aesthetics of the image. The position 210 of the regions of interest is a new position for the regions of interest relative to the position of the regions of interest in the obtained image 202.

Figure 5:
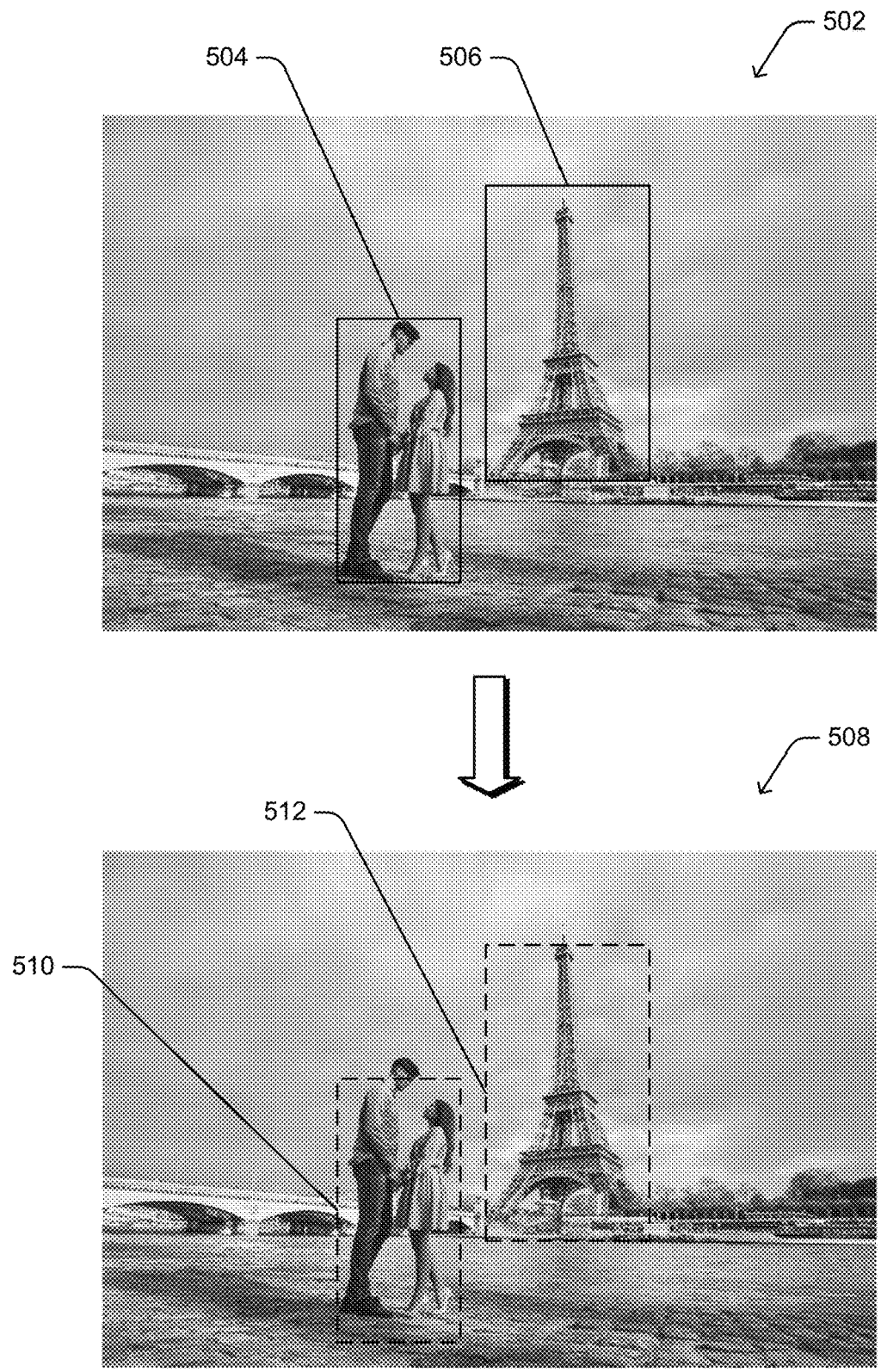
FIG. 5 illustrates an example of a new position for regions of interest.

FIG. 5 illustrates an example of a new position for regions of interest. In the example of FIG. 5, at 502 a digital image having current regions of interest including a foreground region of interest 504 and a background region of interest 506 is illustrated. The current regions of interest are shown as bounding boxes around the salient foreground objects (the man and the woman) and the salient background objects (the Eiffel tower).

The regions of interest positioning module 138 determines a new position of the regions of interest, illustrated at 508. The new position 510 of the foreground region of interest and the new position 512 of the background region of interest are illustrated as bounding boxes using dashed lines. As illustrated in FIG. 5, the regions of interest positioning module 138 determines that the composition of the image is improved by shifting the regions of interest towards the bottom of the image.

Returning to FIG. 2, the composition score 212 is a value that indicates how good the new position determined by the regions of interest positioning module 138 is from an image composition or aesthetics point of view (e.g., how aesthetically pleasing the regions of interest positioning module 138 determines the appearance of the new positioning is to people viewing the image). The composition score can have a range of values, such as from 0 to 1 with 0 being very bad aesthetically and 1 being very good aesthetically. The composition score 212 is calculated using a machine learning system, such as a trained conditional deep neural network as discussed in more detail below.

In one or more implementations, regions of interest positioning module 138 includes a machine learning system that can be implemented using various different machine learning techniques. The machine learning system can be trained, as described below, to determine a position 210 of the background region of interest and the foreground region of interest, as well as a composition score 212 for the determined position 210.

Figure 6:
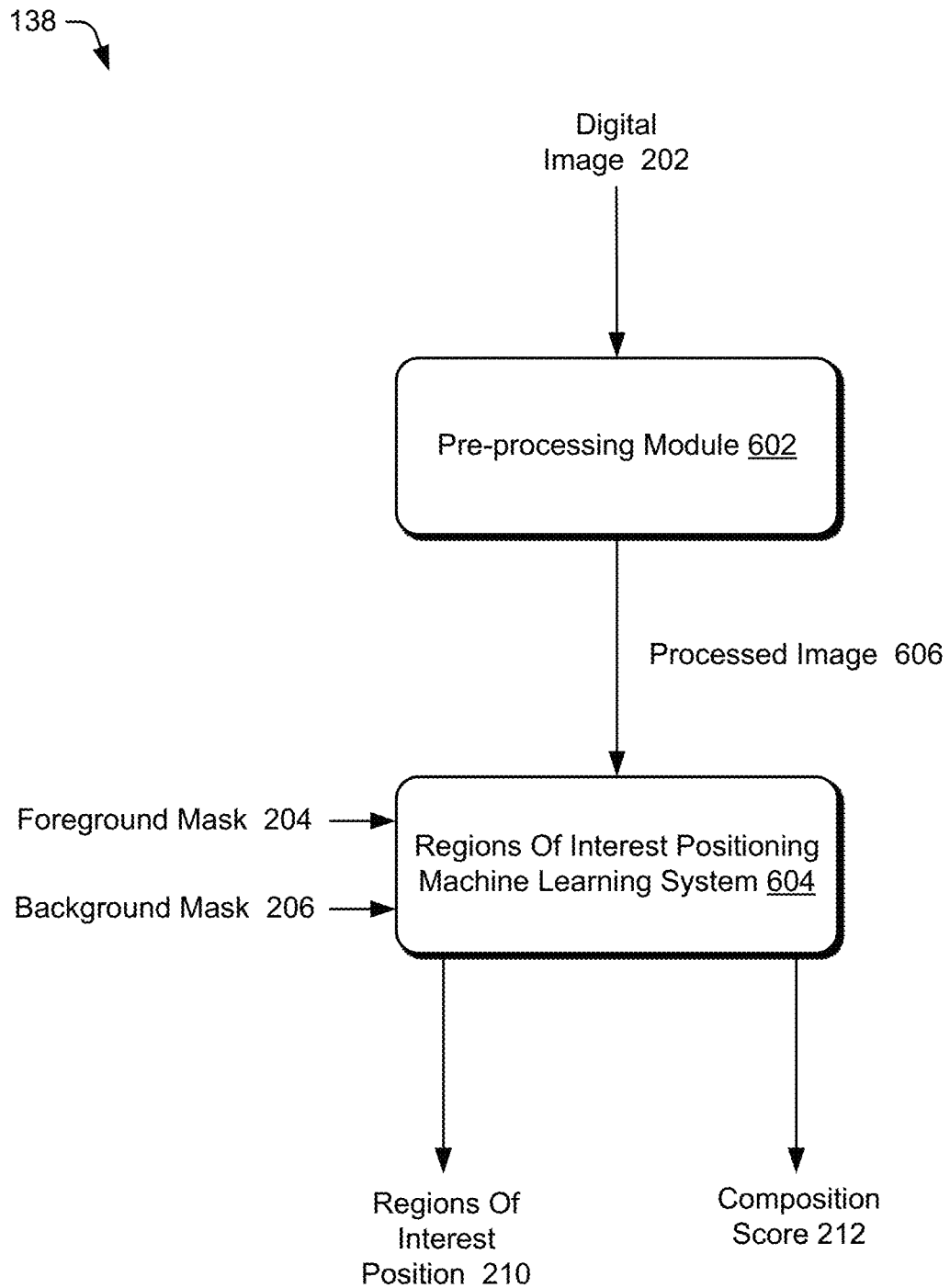
FIG. 6 illustrates an example implementation of a regions of interest positioning module.

FIG. 6 illustrates an example implementation of the regions of interest positioning module 138. The regions of interest positioning module 138 includes a pre-processing module 602 and a regions of interest positioning machine learning system 604.

The obtained digital image 202 is provided to the pre-processing module 602, which generates a processed image 606. The pre-processing module 602 performs various re-sizing and normalization operations to prepare the digital image 202 for input to the machine learning system 604. In one or more implementations, the pre-processing module 602 re-sizes the digital image 202 so that the digital image 202 (a rectangle) has a longest side of 512 pixels. This re-sizing of the digital image 202 typically reduces the size of the digital image 202. Reducing the size of the digital image 202 improves the performance of the regions of interest positioning module 138 because smaller sized digital images can be analyzed by the machine learning system 604 more quickly than larger sized digital images. This quicker analysis results in the machine learning system 604 using fewer resources (e.g., processor resources, energy resources to power the processor or other hardware implementing the machine learning system 604) than when analyzing larger sized digital images.

The regions of interest positioning machine learning system 604 receives the processed image 606 as well as the foreground mask 204 and the background mask 206. In an implementation example, the regions of interest positioning machine learning system 604 is a conditional deep neural network based on a ResNet deep neural network and is trained to detect and output both a position of the regions of interest 210 and a composition score 212. The regions of interest position 210 can include multiple regions of interest (e.g., foreground and background regions of interest). The regions of interest positioning machine learning system 604 is trained, for example, on a set of training images that include some images with good composition and some images with bad composition. For each image in the set of training images, a background mask and foreground mask are also generated and used in the training.

Additionally, for each image in the set of training images, multiple additional versions of the image are generated by cropping the image. This cropping results in altering both the relative and the absolute positioning of the foreground region of interest as well as the background region of interest. For each such cropped image, a background mask and a foreground mask are also generated. These cropped images and masks are also used as training images for the regions of interest positioning machine learning system 604.

In one or more implementations, the cropping of images is performed so that each of the foreground mask and the background mask is not altered by more than a threshold amount. The value of this threshold amount can be selected (e.g., preset) by the developer or designer of the zoom level determination system 104, selected (e.g., via configuration settings) by the user of the zoom level determination system 104, and so forth in order to prevent the zoom level determination system from zooming the imaging component 116 to create a substantially different field of view. This threshold amount can be various amounts, such as one fourth (¼) of the size of the mask. For example, each cropped version of a training image does not alter (e.g., cut off or exclude from the cropped version) more than ¼ of the foreground mask and the background mask. By not altering the foreground mask and the background mask by more than the threshold amount the regions of interest positioning machine learning system 604 is trained to move the position of the region of interest in the digital image 202 by not more than the threshold amount (e.g., ¼) of the size of the foreground and background masks. This prevents the zoom level determination system 104 from zooming the imaging component 116 to create a substantially different field of view. For example, the user may set an initial zoom level with an initial field of view, and the zoom level determination system 104 will automatically set a new zoom level that zooms in or out by some amount (e.g., 10-20% of the initial zoom level) resulting in a field of view that is different by some amount (e.g., 10-20% of the initial field of view) but does not substantially change the field of view (e.g., does not change the field of view by 75%).

It should be noted that the regions of interest positioning machine learning system 604 can determine new positions for each region of interest (e.g., each background region of interest and each foreground region of interest) separately. The direction and distance of a new position for one region of interest (relative to the current position of that region of interest) can be different than the direction and distance of a new position for another region of interest (relative to the current position of that region of interest). For example, the new position of a background region of interest may be 20 pixels to the right of the current position of the background region of interest, and the new positions of a foreground region of interest may be 15 pixels above the current position of the background region of interest.

The regions of interest positioning machine learning system 604 is thus trained to determine positions of the background region of interest and the foreground region of interest to improve the composition of the image. The regions of interest positioning module 138 positions the background region of interest and the foreground region of interest to achieve a highest composition score while not altering the positions more than the threshold amount (e.g., ¼) of the size of the foreground mask and the background mask. These determined positions can be different than the previously identified positions (e.g., the positions of the foreground mask 204 and the background mask 206), but not by more than the threshold amount as discussed above. Positions of different regions of interest in an image can be changed by different amounts, thus altering their absolute positions in the image as well as their positions relative to one another. The regions of interest positioning module 138 is further trained to generate a composition score for the image with the regions of interest positioned as determined by the regions of interest positioning module 138.

Returning to FIG. 2, the regions of interest positioning module 138 provides the regions of interest position 210 and the composition score 212 to the zoom level determination module 140. The zoom level determination module 140 compares the regions of interest position 210 to the edges of the image and determines a zoom adjustment value 214 to include all of the regions of interest as indicated by the regions of interest position 210.

In one or more implementations, the zoom level determination module 140 determines the smallest rectangular region in the obtained image 202 that includes the regions of interest at the positions indicated by the regions of interest position 210. The zoom level determination module 140 then determines an amount to increase or decrease the zoom level so that the field of view of the imaging component 116 includes the regions of interest at the positions indicated by the regions of interest position 210. For example, the zoom level determination module 140 can increase the zoom level so that at least one of the edges of the rectangular region is the same as an edge of the image. Additionally or alternatively, the zoom level determination module 140 can determine to zoom in by a particular amount (such as 1% or 2% of the current zoom level). Additionally or alternatively, the zoom level determination module 140 can determine to zoom in or out so that a margin (e.g., 6 pixels or 20 pixels)

between each edge of the rectangular region and the closest parallel edge of the image is maintained. The amount to increase or decrease the zoom level is optionally a user-configurable value.

The zoom level determination module 140 provides the amount to zoom in or out to the output module 142 as the zoom adjustment value 214. The output module 142 provides a zoom control 210 to the imaging component 116 that causes the imaging component 116 to zoom in or out by the indicated amount as discussed above.

Zooming in or out changes the field of view of the imaging component 116, which can result in new background or foreground regions of interest, different margins, different regions of interest positions, and different composition scores. Accordingly, the input module 132 obtains a new image 202, the background and foreground detection module 134 determines a new foreground mask 204 and a new background mask 206 for the new image 202, and the regions of interest positioning module 138 determines a new regions of interest position and a new composition score for the new image 202.

This zooming in or out can be repeated multiple times until the regions of interest positioning module 138 determines a region of interest position that satisfies a composition score condition. The composition score condition can be implemented in a variety of different manners. In one or more implementations, the composition score condition is that the composition scores for different regions of interest positions in different (e.g., sequential) obtained images 202 becomes saturated (e.g., varies by less than a threshold amount over a threshold number of images, such as 2% over a sequence of 5 images). The values of this threshold amount and threshold number can be selected (e.g., preset) by the developer or designer of the zoom level determination system 104, selected (e.g., via configuration settings) by the user of the zoom level determination system 104, and so forth in order to identify when the zoom level determination system 104 determines composition scores that are deemed (e.g., by the developer, designer, or user) to be close enough that further zooming in or out need not be performed.

Additionally or alternatively, the composition score condition is that the composition scores for different regions of interest positions in different (e.g., sequential) obtained images 202 begins to decrease (e.g., the composition scores decrease over a threshold number of images, such as a sequence of 3 images). The value of this threshold number of images can be selected (e.g., preset) by the developer or designer of the zoom level determination system 104, selected (e.g., via configuration settings) by the user of the zoom level determination system 104, and so forth so as to prevent the zoom level determination system 104 from continuing to determine worse new regions of interest positions.

Additionally or alternatively, the composition score condition is that the composition score for a regions of interest position exceeds a threshold amount (e.g., 0.95 on a scale of 0 to 1). The value of this threshold amount can be selected (e.g., preset) by the developer or designer of the zoom level determination system 104, selected (e.g., via configuration settings) by the user of the zoom level determination system 104, and so forth so as to identify when the zoom level determination system 104 determines a composition scores that is deemed (e.g., by the developer, designer, or user) to be good enough that further zooming in or out need not be performed In response to determining that the composition score condition is satisfied, the zoom level determination module 140 provides an indication to the imaging component 116 as part of zoom control 210 that the zoom level determination system 104 has completed selecting a zoom level for image capture. The zoom level determination module 140 optionally provides the most recently received zoom adjustment value 214 to the imaging component 116 for one last zoom adjustment. The most recent zoom control 210 that the output module 142 provides to the imaging component 116 serves as the indication of the zoom level for image capture.

The result of the zoom level determination system 104 is an automatically set zoom level for image capture by the imaging component 116 with improved composition or aesthetics. For example, returning to FIG. 1, the original zoom level for the imaging component 116 would capture image 120, but the zoom level determination system 104 causes the imaging component 116 to zoom out, resulting in the imaging component 116 capturing the image 122.

Figure 7:
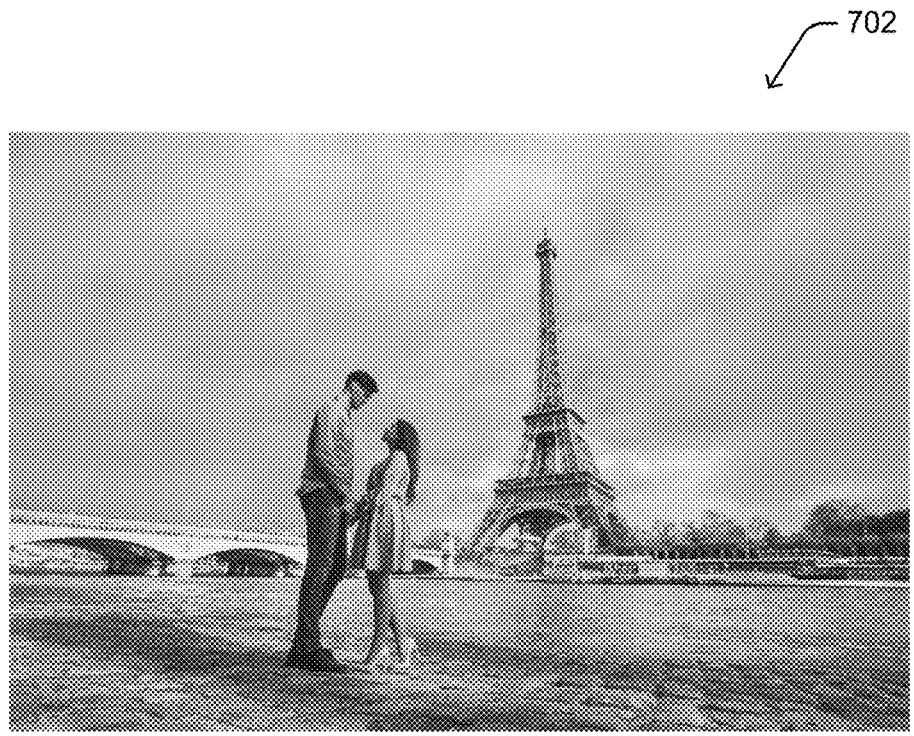
FIG. 7 illustrates an example of automatically setting the zoom level for image capture.
Figure 7:
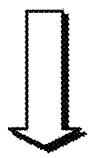
Figure 7:

FIG. 7 illustrates another example of automatically setting the zoom level for image capture. As illustrated in FIG. 7, the original zoom level for the imaging component 116 would capture image 702, but the zoom level determination system 104 causes the imaging component 116 to zoom in, resulting in the imaging component 116 capturing the image 704.

Returning to FIG. 2, it should be noted that although the zoom level determination system 104 is discussed as obtaining images from a digital image stream, additionally or alternatively the zoom level determination system 104 can obtain digital images elsewhere. For example, the zoom level determination system 104 can obtain digital images from a video stream.

It should also be noted that the zoom level determination system 104 obtains the digital images and automatically sets the zoom level in real time. In contrast to cropping images after image capture, the techniques discussed herein alter the zoom level prior to image capture.

In one or more implementations, after determining the zoom level the zoom level determination system 104 maintains that zoom level for a threshold number of images or frames in the digital stream (e.g., 2 frames). Thus, as soon as the zoom level determination system 104 completes determining a zoom level the system 104 need not immediately begin the process again. Additionally or alternatively, the duration for which the zoom level determination system maintains the zoom level can be determined in different manners, such as a threshold amount of time (e.g., 60 or 100 milliseconds). The value of this threshold number of images or frames, or threshold amount of time, can be selected (e.g., preset) by the developer or designer of the zoom level determination system 104, selected (e.g., via configuration settings) by the user of the zoom level determination system 104, and so forth so as to set zoom levels that are good enough while at the same time reducing the computations performed and thus reducing device resource usage.

In one or more implementations, a user preference setting is used to allow a user of the computing device 102 to enable and disable the automatic zoom level setting functionality discussed herein. When enabled, the zoom level determination system 104 automatically determines a zoom level for image capture, whereas when disabled the zoom level determination system 104 does not automatically determine a zoom level for image capture.

Furthermore, in one or more implementations, when the automatic zoom level setting functionality is enabled the zoom level determination system 104 automatically causes the imaging component 116 to zoom to the determined zoom level. Thus, any images captured and stored by the computing device 102 are at the automatically determined zoom level. Additionally or alternatively, the zoom level determination system 104 can provide commands to the imaging component 116 to capture one image at the zoom level set by the user and another image at the automatically determined zoom level. The zoom level determination system 104 can then display one or both of the captured images and suggest that the user store or retain the image captured with the automatically determined zoom level.

Example Procedures

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-7.

Figure 8:
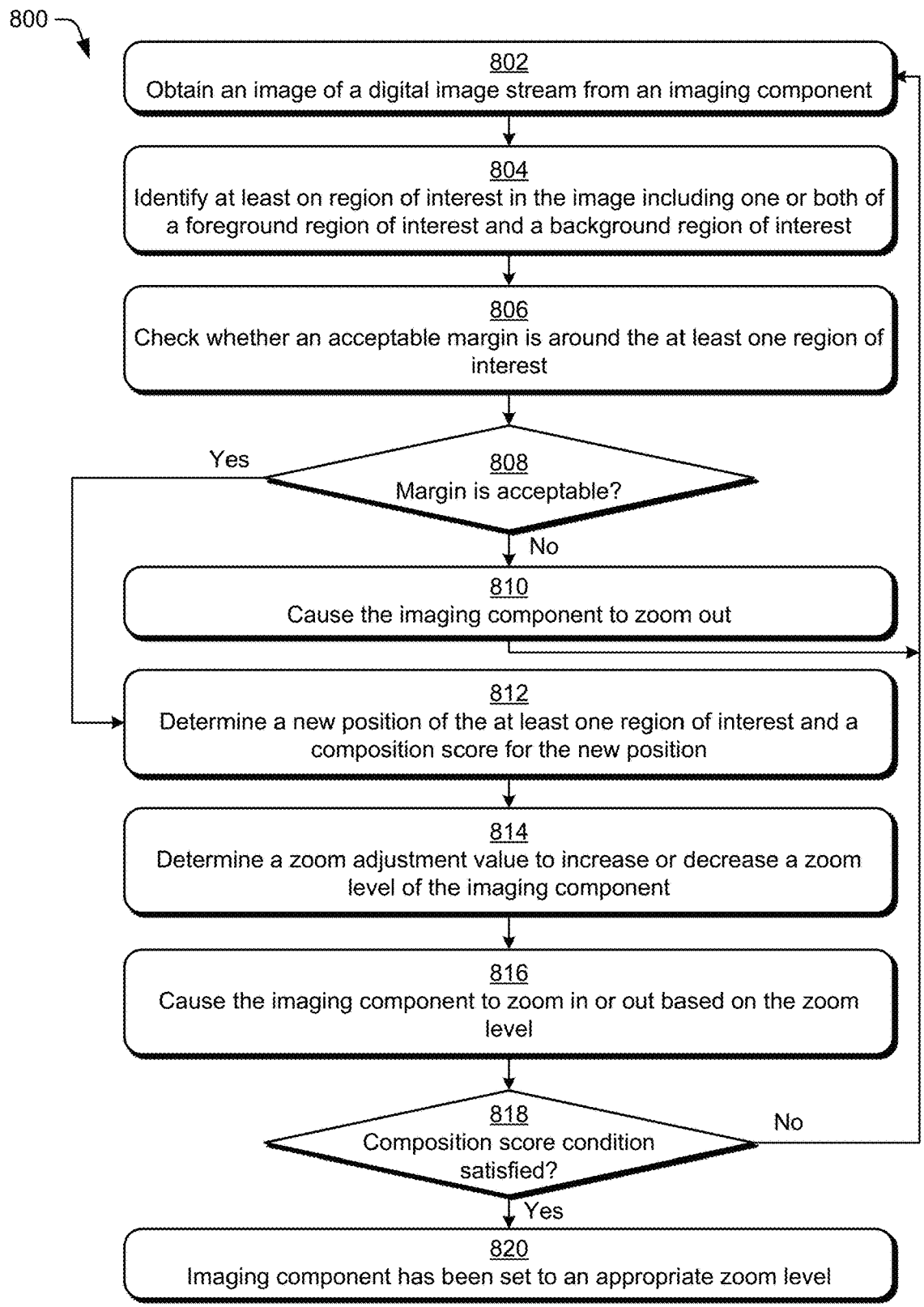
FIG. 8 is a flow diagram depicting a procedure in an example implementation of automatically setting zoom level for image capture.

FIG. 8 is a flow diagram 800 depicting a procedure in an example implementation of automatically setting zoom level for image capture. In this example, an image of a digital image stream is obtained from an imaging component (block 802). The image is obtained from the imaging component having an initial or current zoom level.

At least one region of interest in the image is identified (block 804). The at least one region of interest includes one or both of a foreground region of interest and a background region of interest.

A check is made as to whether an acceptable margin around is around the at least one region of interest (block 806), and the procedure continues based on whether the margin is acceptable (block 808). If the margin is not acceptable, then the imaging component is caused to zoom out (block 810). The procedure then returns to block 802 where another image is obtained that is captured with the imaging component zoomed out more than the previously captured image.

Returning to block 808, if the margin is acceptable then a determination is made of a new position of the at least one region of interest and a composition score for the new position (block 812). The composition score is an indication of how good aesthetically the new position is.

A zoom adjustment value to increase or decrease the zoom level of the imaging component is determined (block 814). The zoom adjustment value determined in block 814 is determined based on the new position of the at least one region that was determined in block 812.

The imaging component is caused to zoom in or out based on the zoom adjustment value (block 816). The procedure continues based on whether the composition score determined in block 812 satisfies a composition score condition (block 818). If the composition score condition is not satisfied, then the procedure returns to block 802 where another image is obtained that is captured with the imaging component zoomed in or out more than the previously captured image. However, if the composition score condition is satisfied, then the imaging component has been set to an appropriate zoom level (block 820) and the procedure ends.

The procedure depicted in flow diagram 800 can be repeated at various intervals, such as after a threshold number of images in the digital image stream have been have been captured (or a threshold amount of time has elapsed) since the procedure was last performed.

Example System and Device

Figure 9:
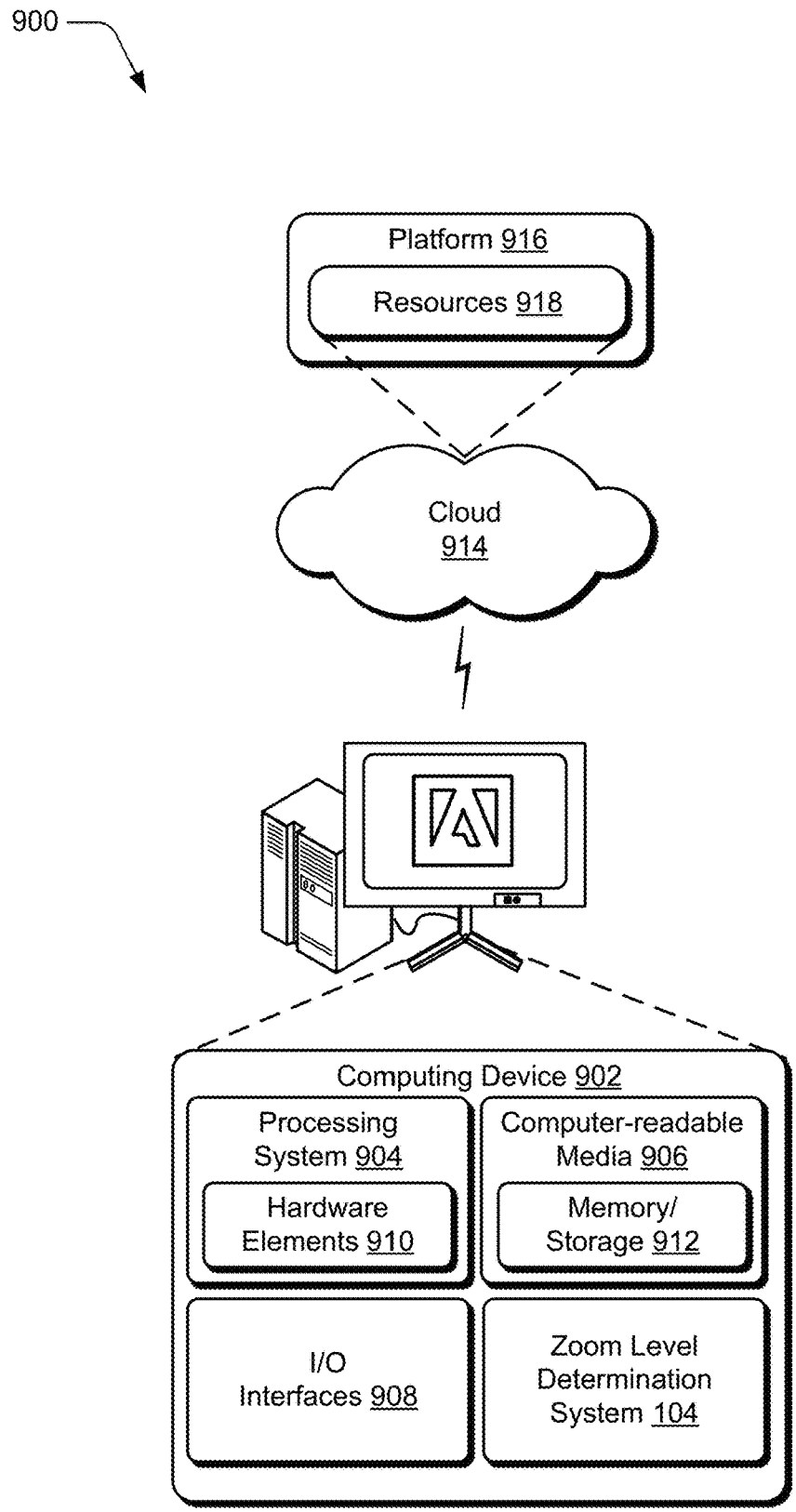
FIG. 9 illustrates an example system including various components of an example device that can be implemented as any type of computing device as described and/or utilize with reference to FIGS. 1-8 to implement aspects of the techniques described herein.

FIG. 9 illustrates an example system generally at 900 that includes an example computing device 902 that is representative of one or more computing systems and/or devices that may implement the various techniques described herein. This is illustrated through inclusion of the zoom level determination system 104. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed, or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Computer-readable storage media is non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In an automatic zooming digital medium environment, a method implemented by at least one computing device, the method comprising:
    obtaining an image of a digital image stream from an imaging component;
    identifying one or more regions of interest in the image, the one or more regions of interest including at least a background region of interest in the image or a foreground region of interest in the image;

determining that a margin around the one or more regions of interest is acceptable;
determining, responsive to determining that the margin around the one or more regions of interest is acceptable, a new positioning of the one or more regions of interest;
determining, based on the one or more regions of interest having the new positioning, a zoom adjustment value to increase or decrease a zoom level; and
causing the imaging component to zoom in or out based on the zoom adjustment value.

2. The method as recited in claim 1, the new positioning of the one or more regions of interest having a composition score, the method further comprising:
repeating the obtaining, the identifying, the determining that the margin is acceptable, the determining the new positioning of the one or more regions of interest, the determining the zoom adjustment value, and the causing until a composition score condition is satisfied.

3. The method as recited in claim 2, the composition score condition comprising the composition score varying by less than a threshold amount over a threshold number of images in the digital images.

4. The method as recited in claim 2, the composition score condition comprising the composition score decreasing over a threshold number of images.

5. The method as recited in claim 1, the identifying the one or more regions of interest comprising using a multi-column machine learning system, a first column of the multi-column machine learning system identifying the foreground region of interest, and a second column of the multi-column machine learning system identifying, based at least in part on the foreground region of interest, the background region of interest.

6. The method as recited in claim 1, wherein the foreground region of interest identifies one or more salient objects in a foreground of the image, and wherein the background region of interest identifies one or more salient objects in a background of the image.

7. The method as recited in claim 1, the margin around the one or more regions of interest comprising a margin around a rectangular region that includes the one or more regions of interest, the margin comprising a number of pixels between each edge of the rectangular region and a closest parallel edge of the image.

8. The method as recited in claim 1, the determining that the margin is acceptable further comprising:
determining an additional zoom adjustment value comprising an amount by which the imaging component is to zoom out; and
causing the imaging component to zoom out by the additional zoom adjustment value.

9. The method as recited in claim 8, the method further comprising repeating the obtaining an image, the identifying the one or more regions of interest, and the determining the additional zoom adjustment value until the margin around the one or more regions of interest is acceptable, or until a threshold amount for zooming out has been met.

10. The method as recited in claim 1, the new positioning of the one or more regions of interest having a composition score, the method further comprising:
generating a foreground mask identifying salient objects in the foreground region of interest;
generating a background mask identifying salient objects in the background region of interest; and
the determining the new positioning of the one or more regions of interest comprising positioning the background region of interest and the foreground region of interest to achieve a highest composition score while not altering the positions of the background region of interest and the foreground region of interest by more than a threshold amount of the size of the foreground mask and the background mask.

11. The method as recited in claim 1, the determining the new positioning of the one or more regions of interest comprising using a machine learning system to generate the new positioning of the one or more regions of interest.

12. In an automatic zooming digital medium environment, a computing device comprising:
an imaging component;
a processor; and
computer-readable storage media having stored thereon multiple instructions that, responsive to execution by the processor, cause the processor to perform operations including:
receiving, from the imaging component, an image of a digital image stream captured by the imaging component;
identifying at least one region of interest in the image, the at least one region of interest including one or both of a background region of interest in the image and a foreground region of interest in the image;
determining that a margin around the at least one region of interest is acceptable;
determining, responsive to determining that the margin around the at least one region of interest is acceptable, a new positioning of the at least one region of interest;
determining, with the at least one region of interest having the new positioning, a zoom adjustment value to increase or decrease a zoom level; and
causing the imaging component to zoom in or out based on the zoom adjustment value.

13. The computing device as recited in claim 12, the new positioning of the at least one region of interest having a composition score, and the operations further including:
repeating the receiving, the identifying, the determining that the margin is acceptable, the determining the new positioning, the determining the zoom adjustment value, and the causing until a composition score condition is satisfied.

14. The computing device as recited in claim 12, the determining that the margin is acceptable further comprising:
determining an additional zoom adjustment value comprising an amount by which the imaging component is to zoom out; and
causing the imaging component to zoom out by the additional zoom adjustment value.

15. The computing device as recited in claim 14, the operations further comprising repeating the receiving an image, the identifying at least one region of interest, and the determining the additional zoom adjustment value until the margin around the one or more regions of interest is acceptable, or until a threshold amount for zooming out has been met.

16. The computing device as recited in claim 12, the new positioning of the at least one region of interest having a composition score, the at least one region of interest including a foreground mask identifying salient objects in the foreground region of interest and a background mask identifying salient objects in the background region of interest, and the determining the new positioning of the at least one region of interest comprising positioning the background region of interest and the foreground region of interest to achieve a highest composition score while not altering the background region of interest and the foreground region of interest by positions more than a threshold amount of the size of the foreground mask and the background mask.

17. The computing device as recited in claim 12, the identifying the at least one region of interest comprising using a multi-column machine learning system, a first column of the multi-column machine learning system identifying the foreground region of interest, and a second column of the multi-column machine learning system identifying, based at least in part on the foreground region of interest, the background region of interest.

18. A system comprising:
   an input module, implemented at least in part in hardware, to obtain an image of a digital image stream from an imaging component;
   means for determining a zoom adjustment value to increase or decrease a zoom level based at least in part on identifying a new positioning of at least one of a background region of interest in the image and a foreground region of interest in the image; and
   an output module, implemented at least in part in hardware, causing the imaging component to zoom in or out based on the zoom adjustment value.

19. The system as recited in claim 18, the means for determining the zoom adjustment value including determining the zoom adjustment value based at least in part on maintaining an acceptable margin around the at least one of the background region of interest and the foreground region of interest.

20. The system as recited in claim 18, the means for determining the zoom adjustment value including determining a composition score of the image based on the new positioning, and determining the zoom adjustment value based at least in part on positioning the at least one of the background region of interest and the foreground region of interest to achieve a highest composition score.

* * * * *